United States Patent [19]

Rao

[11] Patent Number: 6,084,853
[45] Date of Patent: *Jul. 4, 2000

[54] METHOD OF MANAGING DIGITAL SIGNAL CARRYING FACILITIES

[75] Inventor: Nagaraja Rao, Boca Raton, Fla.

[73] Assignee: Siemens Information and Communication Networks, Inc., Boca Raton, Fla.

[ * ] Notice: This patent issued on a continued prosecution application filed under 37 CFR 1.53(d), and is subject to the twenty year patent term provisions of 35 U.S.C. 154(a)(2).

[21] Appl. No.: 08/625,184

[22] Filed: Mar. 29, 1996

[51] Int. Cl.[7] ........................................... H04J 3/14
[52] U.S. Cl. ............................................. 370/227; 370/228
[58] Field of Search .................................... 370/217, 218, 370/225, 227, 228, 357, 358, 359, 420, 458, 459, 537, 244, 264; 379/27, 93.05, 93.06, 93.16, 100.12

[56] References Cited

U.S. PATENT DOCUMENTS

| | | | |
|---|---|---|---|
| 5,383,180 | 1/1995 | Katalopoulos et al. | 370/249 |
| 5,418,776 | 5/1995 | Purkey et al. | 370/217 |
| 5,436,895 | 7/1995 | Matsumoto | 370/391 |
| 5,452,286 | 9/1995 | Kitayama | 370/228 |

*Primary Examiner*—Chau Nguyen
*Assistant Examiner*—Soon-Dong Hyun
*Attorney, Agent, or Firm*—Joseph S. Codispoti

[57] ABSTRACT

A method for managing transmission lines within a communication system which enables the automatic restoration of network access for user lines. The communication system includes user lines interfaced with groups of transmission lines and each group of transmission lines includes dedicated transmission lines which are connected to the user lines, idle transmission lines and reserved transmission lines. The method makes a number of idle transmission lines among the groups of transmission lines available for coupling by user lines which have a dedicated transmission line in a group of transmission lines that fails. The method determines the minimum number of transmission lines to be reserved by a comparison of the numbers of certain types of transmission lines in the different groups.

20 Claims, 9 Drawing Sheets

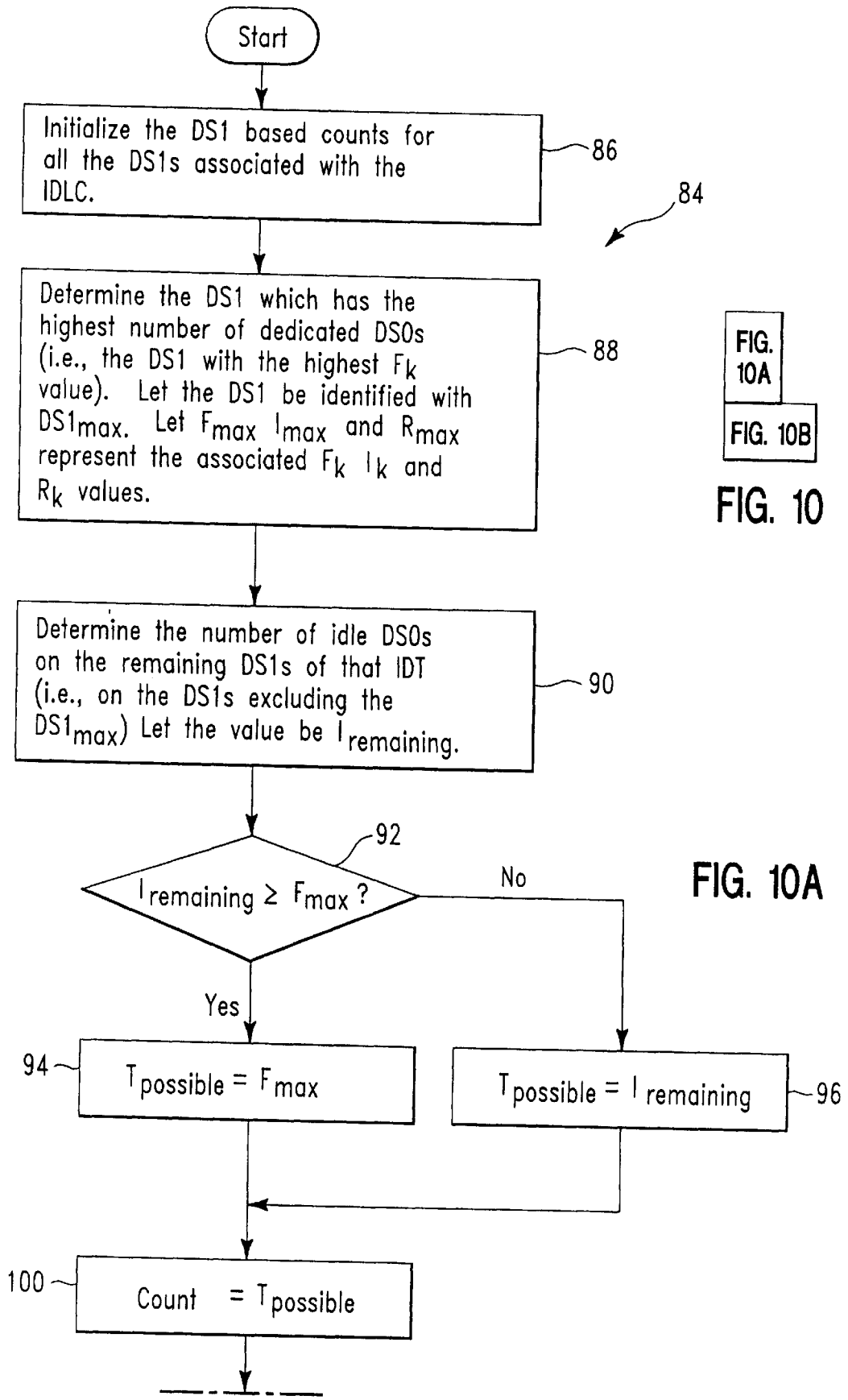

| DS1s | DS1 Based Counts | | |
|---|---|---|---|
| | $I_k$ | $F_k$ | $R_k$ |
| $DS1_1$ | 22 | 0 | 0 |
| $DS1_2$ | 24 | 0 | 0 |
| $DS1_3$ | 24 | 0 | 0 |
| $DS1_4$ | 24 | 0 | 0 |
| $DS1_5$ | 22 | 0 | 0 |
| Totals > | 116 | 0 | 0 |

FIG. 12

| DS1s | DS1 Based Counts | | |
|---|---|---|---|
| | $I_k$ | $F_k$ | $R_k$ |
| $DS1_1$ | 18 | 4 | 0 |
| $DS1_2$ | 20 | 4 | 0 |
| $DS1_3$ | 20 | 4 | 0 |
| $DS1_4$ | 20 | 4 | 0 |
| $DS1_5$ | 18 | 4 | 0 |
| Totals > | 96 | 20 | 0 |

FIG. 13

| DS1s | DS1 Based Counts | | |
|---|---|---|---|
| | $I_k$ | $F_k$ | $R_k$ |
| $DS1_1$ | 17 | 4 | 1 |
| $DS1_2$ | 19 | 4 | 1 |
| $DS1_3$ | 19 | 4 | 1 |
| $DS1_4$ | 19 | 4 | 1 |
| $DS1_5$ | 17 | 4 | 1 |
| Totals > | 91 | 20 | 5 |

FIG. 14

| DS1s | DS1 Based Counts | | |
|---|---|---|---|
| | $I_k$ | $F_k$ | $R_k$ |
| $DS1_1$ | 17 | 4 | 1 |
| Fails | ☐ | ☐ | ☐ |
| $DS1_3$ | 19 | 4 | 1 |
| $DS1_4$ | 19 | 4 | 1 |
| $DS1_5$ | 17 | 4 | 1 |
| Totals > | 72 | 16 | 4 |

FIG. 15

| DS1s | DS1 Based Counts | | |
|---|---|---|---|
| | $I_k$ | $F_k$ | $R_k$ |
| $DS1_1$ | 17 | 5 | 0 |
| Fails | ☐ | ☐ | ☐ |
| $DS1_3$ | 19 | 5 | 0 |
| $DS1_4$ | 19 | 5 | 0 |
| $DS1_5$ | 17 | 5 | 0 |
| Totals > | 72 | 20 | 0 |

FIG. 16

| DS1s | DS1 Based Counts | | |
|---|---|---|---|
| | $I_k$ | $F_k$ | $R_k$ |
| $DS1_1$ | 15 | 5 | 2 |
| Fails | ☐ | ☐ | ☐ |
| $DS1_3$ | 18 | 5 | 1 |
| $DS1_4$ | 17 | 5 | 2 |
| $DS1_5$ | 15 | 5 | 2 |
| Totals > | 65 | 20 | 7 |

FIG. 17

| DS1s | DS1 Based Counts | | |
|---|---|---|---|
| | $I_k$ | $F_k$ | $R_k$ |
| $DS1_1$ | 15 | 5 | 2 |
| Fails | | | |
| Fails | | | |
| $DS1_4$ | 17 | 5 | 2 |
| $DS1_5$ | 15 | 5 | 2 |
| Totals > | 47 | 15 | 6 |

FIG. 18

| DS1s | DS1 Based Counts | | |
|---|---|---|---|
| | $I_k$ | $F_k$ | $R_k$ |
| $DS1_1$ | 15 | 6 | 1 |
| Fails | | | |
| Fails | | | |
| $DS1_4$ | 17 | 7 | 0 |
| $DS1_5$ | 15 | 7 | 0 |
| Totals > | 47 | 20 | 1 |

FIG. 19

| DS1s | DS1 Based Counts | | |
|---|---|---|---|
| | $I_k$ | $F_k$ | $R_k$ |
| $DS1_1$ | 12 | 6 | 4 |
| Fails | | | |
| Fails | | | |
| $DS1_4$ | 14 | 7 | 3 |
| $DS1_5$ | 12 | 7 | 3 |
| Totals > | 38 | 20 | 10 |

FIG. 20

| DS1s | DS1 Based Counts | | |
|---|---|---|---|
| | $I_k$ | $F_k$ | $R_k$ |
| $DS1_1$ | 12 | 6 | 4 |
| $DS1_2$ | 24 | 0 | 0 |
| Fails | | | |
| $DS1_4$ | 14 | 7 | 3 |
| $DS1_5$ | 12 | 7 | 3 |
| Totals > | 62 | 20 | 10 |

FIG. 21

| DS1s | DS1 Based Counts | | |
|---|---|---|---|
| | $I_k$ | $F_k$ | $R_k$ |
| $DS1_1$ | 15 | 6 | 1 |
| $DS1_2$ | 18 | 0 | 6 |
| Fails | | | |
| $DS1_4$ | 17 | 7 | 0 |
| $DS1_5$ | 15 | 7 | 0 |
| Totals > | 65 | 20 | 7 |

FIG. 22

| DS1s | DS1 Based Counts | | |
|---|---|---|---|
| | $I_k$ | $F_k$ | $R_k$ |
| $DS1_1$ | 15 | 6 | 1 |
| $DS1_2$ | 18 | 0 | 6 |
| $DS1_3$ | 24 | 0 | 0 |
| $DS1_4$ | 17 | 7 | 0 |
| $DS1_5$ | 15 | 7 | 0 |
| Totals > | 89 | 20 | 7 |

FIG. 23

| DS1s | DS1 Based Counts | | |
|---|---|---|---|
| | $I_k$ | $F_k$ | $R_k$ |
| $DS1_1$ | 16 | 6 | 0 |
| $DS1_2$ | 21 | 0 | 3 |
| $DS1_3$ | 20 | 0 | 4 |
| $DS1_4$ | 17 | 7 | 0 |
| $DS1_5$ | 15 | 7 | 0 |
| Totals > | 89 | 20 | 7 |

FIG. 24

METHOD OF MANAGING DIGITAL SIGNAL CARRYING FACILITIES

Related applications entitled "A REPROVISIONING MONITOR", Ser. No. 08/625,266; AN IMPROVED DIGITAL LOOP CARRIER SYSTEM", Ser. No. 08/625,186, abandoned; and "A METHOD OF PROVIDING CONTINUAL NETWORK ACCESS FOR SUBSCRIBER COMMUNICATION LINES", Ser. No. 08/625,185, abandoned by the same inventor, are being filed on the same day herewith and are incorporated by reference herein.

TECHNICAL FIELD

The present invention relates generally to telephone communication systems and more particularly, to a method for managing transmission lines which enables the automatic restoration of network access for user lines in the event of a failure.

BACKGROUND OF THE INVENTION

In modern telephone networks the use of digital technology has become widespread. Utilizing digital technology in telephone networks has a number of advantages. One advantage is that the digital transmission of data is less susceptible to noise, which improves the quality of the transmission. While another advantage is that the digital format is ideal for being implemented on solid state technology such as integrated circuits. This is significant because most of the developments in technology has been in this area.

In order to exploit the advantages of digital technology, new techniques and equipment had to be developed. These new developments have included new modulation techniques, digital switches and various digital interfaces.

An example of a system utilized in digital telephone networks is shown in FIG. 1, which is known as a Digital Loop Carrier or an Integrated Digital Loop Carrier (IDLC) system 10. The IDLC system 10 is utilized to couple subscriber lines 22, 24, 26, 28 to a switching system 12, such as an EWSD® switching system, which routes calls from the subscriber lines 22, 24, 26, 28 to other parts of the phone network.

The IDLC system 10 includes a remote digital terminal (RDT) 30 which interfaces the subscriber lines 22, 24, 26, 28 to a number of 1.544 MPBS highways 14,18. The 1.544 MPBS highways 14,18 are also known as Digital Signal Level 1 lines (DS1) and are utilized to carry calls from the subscriber lines 22, 24, 26, 28 to the switching system 12. Each DS1 includes 24 individual 64 KBPS digital signal carrying facilities, which are also known as Digital Signal Level 0 lines (DS0). For discussion purposes, only one of the 24 DS0s is shown per each DS1.

The RDT 30 is utilized as an interface to assign and connect the DS0s to the subscriber lines. The assignment and connection of the DS0s is either accomplished on a per call basis or on a provisioned basis. The per call basis is utilized when a large concentration of subscriber lines are required. This means that the RDT 30 has to dynamically assign and connect the DS0s to the subscriber lines. The subscriber lines utilizing a per call basis interface are known as concentrated lines 24,26. While DS0s assigned and connected on a provisioned basis are known as dedicated DS0s and the connected subscriber lines are known as nonconcentrated lines 22,28. The dedicated DS0s 16,20 are nailed up which means semi-permanently connected to the respective subscriber lines 22,28 at the RDT 30.

A problem with utilizing a provisioned type of interface is that the non-concentrated subscriber lines 22,28 often lose access to the network. Very often this is caused by a failed or blocked DS1, which causes the DS0s to become unavailable to the subscriber lines. This is a serious problem since the subscriber lines connected to the blocked DS1 are unable to be utilized to make calls. The DS1s are often blocked due to technical problems or maintenance purposes.

The above discussed problem is partially removed by incorporating DS1 protection switching capability within the RDT 30. An example of a IDLC system having DS1 protection switching is shown in FIG. 2. In such a system, a standby DS1 36 is reserved in the event one of the other DS1s 32,34 fail or is blocked. When a DS1 fails, the traffic from that DS1 32 is switched to the standby DS1 36 as shown in FIG. 3. Thus, the DS1 protection switching partially solves the problem of a non-concentrated line losing access. However, the problem remains if a subsequent DS1 34 fails before the previous failed DS1 32 is repaired as shown in FIG. 4. In this situation, the non-concentrated line 40 loses access. Thus, DS1 protection switching is inadequate when there are consecutive DS1 failures within a IDLC system.

It is therefore an object of the present invention to provide a method for managing DS0s and DS1s in order to provide continual network access for subscriber lines even in the event of consecutive DS1 failures within a Digital Loop Carrier System.

SUMMARY OF THE INVENTION

The aforementioned problems are obviated by the present invention which provides a method for managing transmission lines within a communication system which enables the automatic restoration of network access for user lines in the event of a failure. The communication system includes said user lines interfaced with groups of transmission lines. Each group of transmission lines includes dedicated transmission lines which are connected to the user lines, idle transmission lines and reserved transmission lines. The method comprises determining which one of the groups of transmission lines has the greatest number of dedicated transmission lines and counting the number of dedicated transmission lines in said group. The method then counts the total number of idle transmission lines within the other groups of transmission lines and compares said total number of idle transmission lines to the number of dedicated transmission lines in the group with the greatest number of said lines in order to find a minimum number of idle transmission lines to be reserved. The method then reserves the minimum number of idle transmission lines within the other groups of transmission lines.

The method may also include reserving an additional number of idle transmission lines within the group of transmission lines having the greatest number of dedicated transmission lines if the number of dedicated transmission lines in said group is less than said total number of idle transmission lines. The additional number of idle transmission lines corresponds to the difference between the number of dedicated transmission lines in the group with the greatest number of said lines and said total number of idle transmission lines.

BRIEF DESCRIPTION OF THE DRAWINGS

For a better understanding of the invention, reference is made to the following description of an exemplary embodiment thereof, and to the accompanying drawings, wherein:

FIGS. 12–24 are tables illustrating the operation of a repro reserve method according to the present invention.

DETAILED DESCRIPTION

Figure 1:
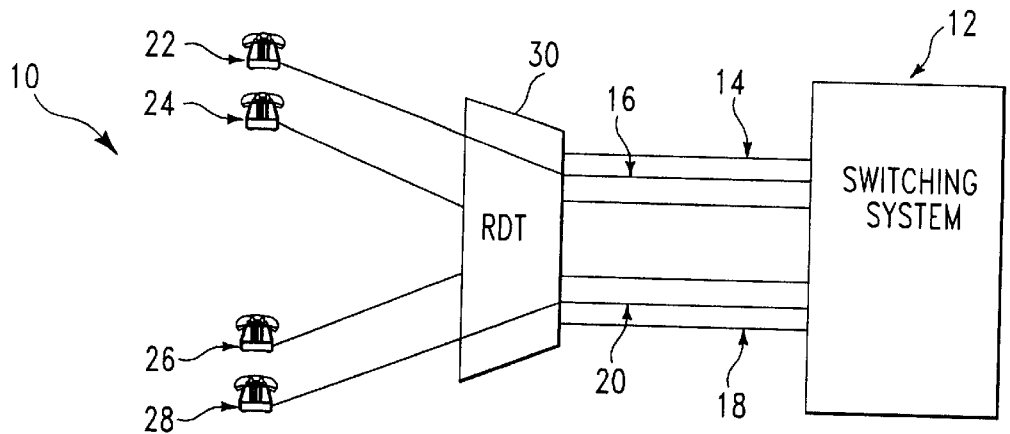
FIG. 1 is a block diagram of an Integrated Digital Loop Carrier system.
Figure 2:
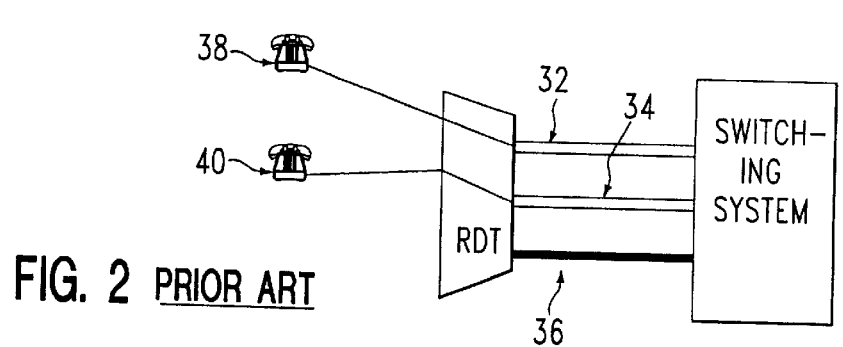
FIG. 2 is a block diagram of an Integrated Digital Loop Carrier system incorporating DS1 protection switching.
Figure 3:
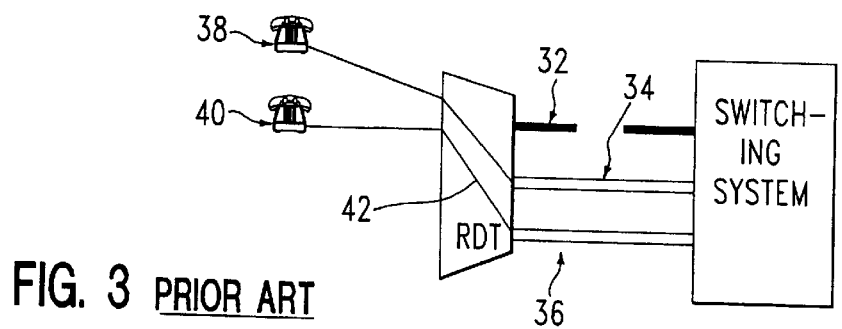
FIG. 3 is a block diagram of an Integrated Digital Loop Carrier system incorporating DS1 protection switching exhibiting a DS1 failure.
Figure 4:
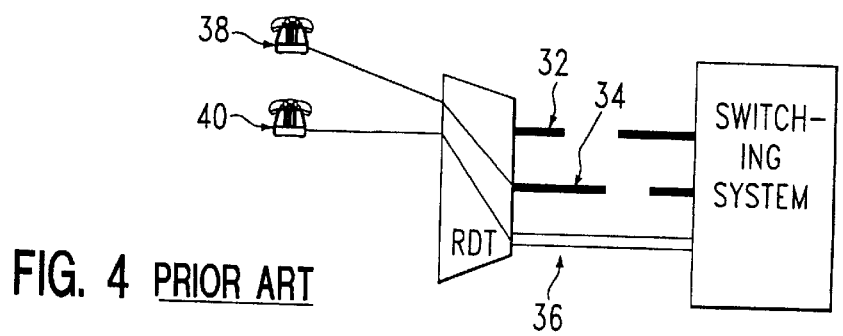
FIG. 4 is a block diagram of an Integrated Digital Loop Carrier system incorporating DS1 protection switching exhibiting consecutive DS1 failures.
Figure 5:
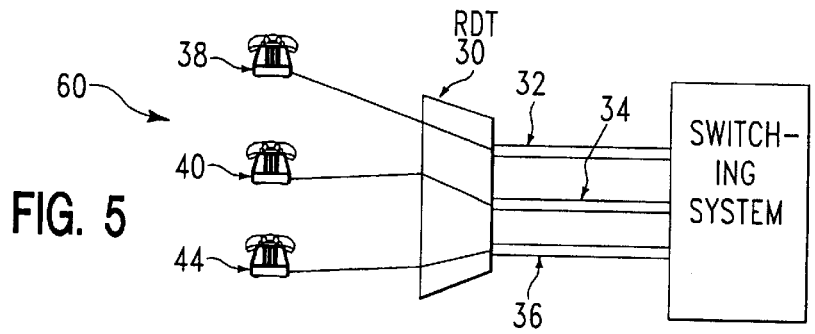
FIG. 5 is a block diagram of an Integrated Digital Loop Carrier system according to the present invention.

FIG. 5 illustrates an IDLC system according to the present invention. The IDLC system 60 has the same basic structure as the systems described in the prior art except that it incorporates a reprovisioning monitor that provides continual switch or network access for the subscriber lines. As can be seen from FIG. 5, the non-concentrated lines 38, 40 & 44 are connected to respective transmission lines known as Digital Signal Level 1s (DS1s) 32, 34 & 36, which carry the dedicated Digital Signal Level 0s (DS0s).

Figure 6:
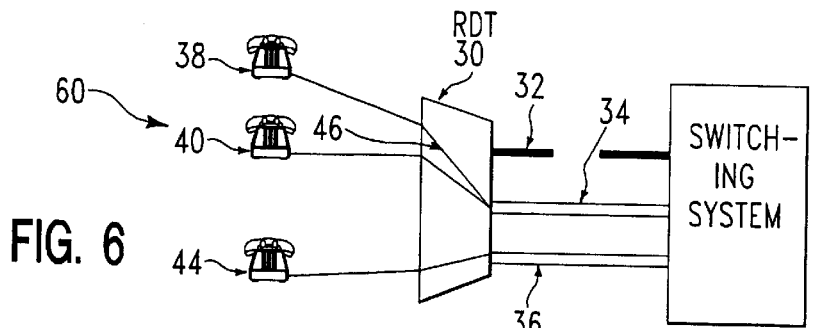
FIG. 6 is a block diagram of an Integrated Digital Loop Carrier system according to the present invention exhibiting a DS1 failure.
Figure 7:
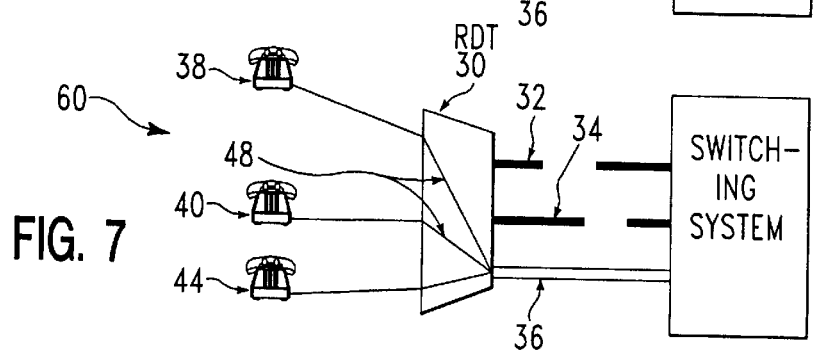
FIG. 7 is a block diagram of an Integrated Digital Loop Carrier system according to the present invention exhibiting consecutive DS1 failures.

In the event of a single DS1 failure as shown in FIG. 6, the non-concentrated line 38 is reprovisioned 46 to another dedicated DS0 contained in DS1 34. In the event of a consecutive failure as shown in FIG. 7, non-concentrated lines 38, 40 are both reprovisioned 48 to other dedicated DS0s within DS1 36. The reprovisioning of the non-concentrated lines in both situations is controlled by the reprovisioning monitor implemented in the IDLC system 60 according to the present invention. The specific details of the reprovisioning monitor are discussed below.

The operation of the reprovisioning monitor has a number of advantages over DS1 protection switching. DS1 protection switching requires a standby DS1 to be reserved in case of a failure. In contrast, the reprovisioning monitor does not require an extra DS1 to be reserved within an IDLC system. This is because the reprovisioning is accomplished by utilizing idle DS0s of other DS1s, which enables all of the DS1s to be utilized to carry traffic.

The reprovisioning monitor also eliminates the multiple switching required by DS1 protection switching. In a system utilizing DS1 protection switching, the traffic must be switched back from the failed DS1 when repaired in order to free up the standby DS1 in the case of another failure. In contrast, the reprovisioning monitor does not require the switching back of traffic. Moreover, the reprovisioning of non-concentrated lines does not depend on the failures of other DS1s. Therefore, the non-concentrated lines are capable of regaining network access even when multiple DS1s fail.

Another advantage of the reprovisioning monitor is that the reprovisioning of non-concentrated lines does not depend on any particular DS1 which contains the idle DS0s. Thus, if necessary, the DS1s utilized to reprovision a particular non-concentrated line is capable of being predetermined. This is beneficial in certain distributed Digital Loop Carrier systems where the dedicated DS0s are required to be served by a pre-selected group of DS1s. For example, a distributed Digital Loop Carrier system may require that the DS0s dedicated to an ISDN BA line be served by the same interfacing unit or interfacing unit portion.

Figure 8:
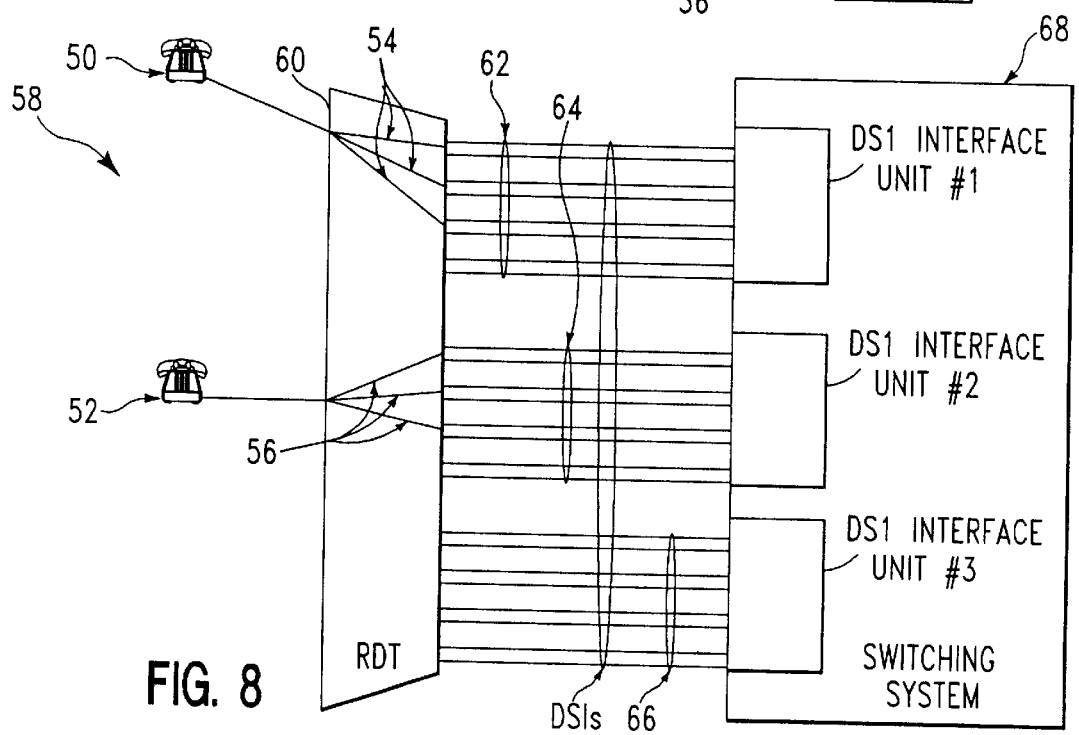
FIG. 8 is a block diagram of a distributed Integrated Digital Loop Carrier system according to the present invention.

Such a distributed system according to the present invention is shown in FIG. 8. The distributed IDLC system 58 includes an interface unit 60, DS1 groups 62,64,66 and a switching system 68, which functions similarly as previously described for the IDLC system. In the distributed IDLC system 58, the subscriber lines are Integrated Service Digital Network (ISDN) lines 50,52. The ISDN lines 50, 52 are broadband communication lines that allows the transmission of voice services along with other types of services such as video. The interface 60 has the capability of separating the respective two B and one D channels of ISDN lines 50, 52 so that the ISDN data may be compatible with the rest of the network.

A reprovisioning monitor implemented in the distributed system 58 enables the system to maintain a relationship between two or more dedicated DS0s. In this case, the DS1s carrying the DS0s dedicated to the B and D channels are required to be grouped together. As can be seen, the dedicated DS0s associated with the two B and one D channels of ISDN line 50 can be split into different DS1s of the first DS1 group 62. Similarly, the dedicated DS0s associated with the two B and one D channels of ISDN line 52 can be split into different DS1s of the second DS1 group 64.

Figure 9:
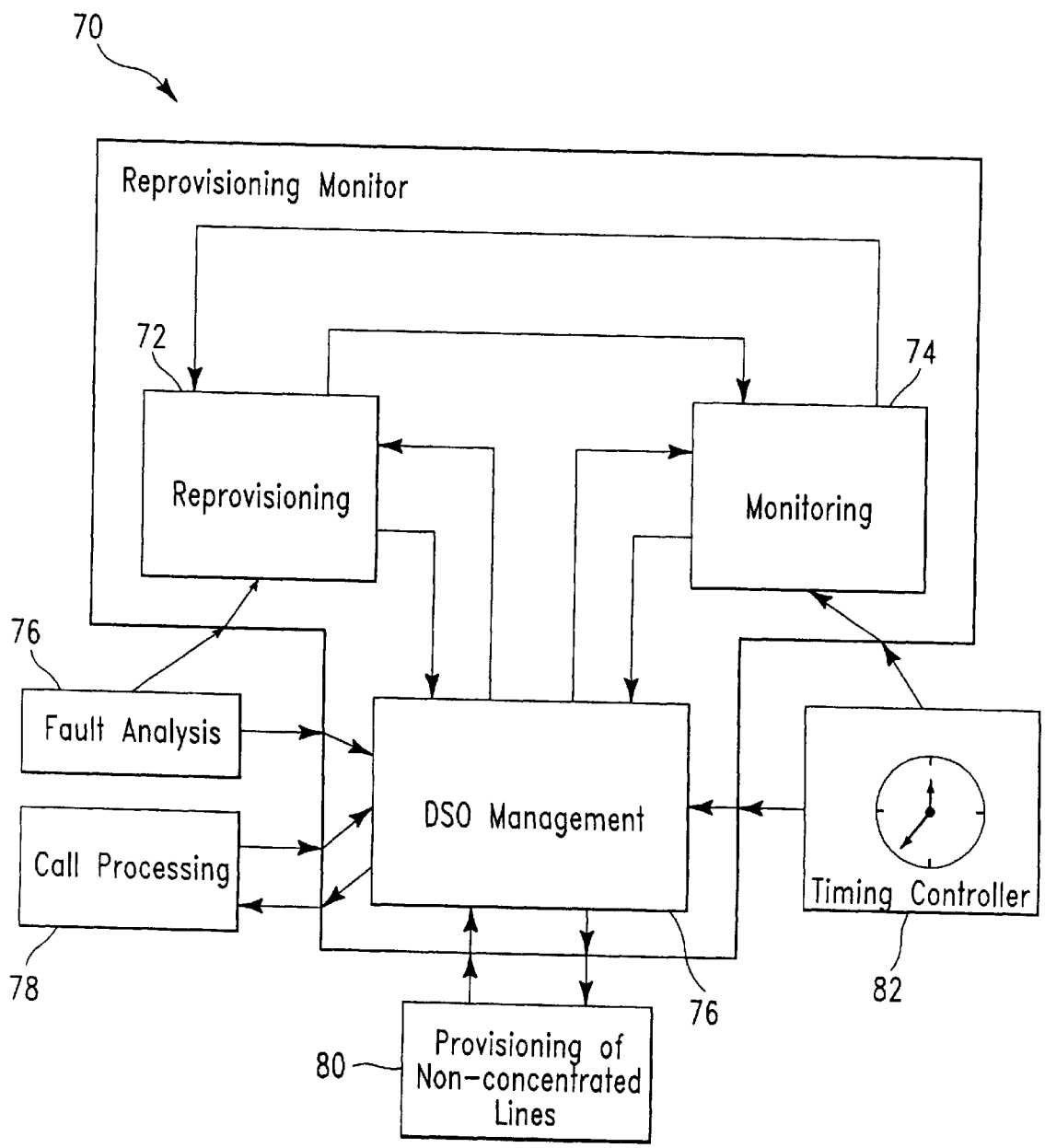
FIG. 9 is a block diagram of a reprovisioning monitor according to the present invention.

FIG. 9 shows a block diagram of the reprovisioning monitor according to the present invention. The reprovisioning monitor 70 includes a reprovisioning element 72, a monitoring element 74 and a DS0 management element 76, which are preferably implemented as additional software functions within the RDT or the switching system. The elements of the reprovisioning monitor 70 interface with the rest of the switching system, which includes a fault analysis element 76, a call processor 78, a provisioning element 80 and a timing control 82.

When a DS1 fails or gets blocked during operation, the number of non-concentrated lines that have to be provisioned is dependent on the number of dedicated DS0s present on the failed DS1. In order to minimize the number of new DS0s required to support this reprovisioning, the DS0 management element 76 during normal operation attempts to distribute the dedicated DS0s among all the DS0s serving the IDLC system (preferably, equally or substantially equally), while the non-concentrated lines are provisioned by the provisioning element 80. The call processor 78 provides information which enables the DS0 management element 76 to select the DS0s to be distributed.

The DS0 management element 76 also reserves a certain number of DS0s by reducing the number of idle DS0s which are available to the concentrated lines. The reserved DS0s are utilized in order to reduce the situations where the reprovisioning process is deferred. The DS0 management element 76 only reserves the minimum number of DS0s necessary to prevent deferment of the reprovisioning. This is accomplished by a repro reserve method of the present invention which is invoked periodically by the DS0 management element 76. The timing control 82 provides the timing for when a repro reserve method is invoked.

The DS0 management element 76 also provides a method for determining the maximum number of DS0s to be reserved to cover the failure of any one DS1, which will be discussed in detail later.

The fault analysis element 76 is utilized to detect when a DS1 fails or is blocked in order to notify the reprovisioning element 72. In response to this, the reprovisioning element 72 first identifies all the non-concentrated lines which have dedicated DS0s on the failed DS1. For each identified non-concentrated line, the reprovisioning element 72 clears the assignment of the dedicated DS0 from the failed DS1. The reprovisioning element 72 then reprovisions or connects each identified non-concentrated line to an idle DS0 taken from one of the remaining DS1s by way of the DS0 management element 76. This reprovisioning only occurs if there is an idle DS0 available at that time.

In order to determine if an idle DS0 is available the monitoring element 74 periodically communicates with the DS0 management element 76. The timing of this communication is controlled by the timing control 82. In the event an idle DS0 is not available, the monitoring element 74 delays the reprovisioning until one is available. The monitoring element 76 utilizes a polling technique to determine the availability of idle DS0s when the reprovisioning of a few non-concentrated lines are pending. Polling techniques are well known techniques utilized in multi-point line configurations.

As discussed earlier, the DS0 management element 76 invokes a repro reserve method of the present invention in order to reserve the minimum number of DS0s necessary to prevent deferment of the reprovisioning process. In order to accomplish this, the repro reserve method operates under a number of rules and maintains a number of counts related to the IDLC system.

The counts maintained include the number of dedicated DS0s ($F_k$), number of reserved DS0s ($R_k$) and number of idle DS0s ($I_k$). In regard to the above counts, the subscript K associates the counts to a particular DS1. Also, let N identify the number of DS1s and M identify the number of non-concentrated lines within the IDLC system. Let $R_{total}$ identify the total number of reserved DS0s and $F_{total}$ identify the total number of dedicated DS0s within the IDLC system. It should be noted that M is equal to $F_{total}$. In order to understand the repro reserve method, let the DS1s identified with the numbers 1 to N so that the associated $F_k$ values are in descending order. In other words, $F_k \geq F_{k+1}$.

The repro reserve method operates under the following rules. A DS0 can only be reserved on a DS1 if the associated number of idle DS0s ($I_k$) is greater than 1. Reserving a DS0 on a DS1 implies that the number of reserved DS0s ($R_k$) is increased by 1. Also, each time a DS0 is reserved on a DS1, the associated number of idle DS0s on that DS1 is decreased by 1. The last rule followed by the method requires that when a DS1 is selected in order to reserve a DS0, the DS1 that has the lowest $F_k + R_k$ value is chosen.

The repro reserve method following the above last rule ensures that the DS0s are not reserved in excess. This is because when a DS1 fails or is blocked, the non-concentrated lines having the dedicated DS0s on the failed DS1 are reprovisioned utilizing the DS0s reserved on the remaining DS1s. If $r_k$ represents the excess number of reserved DS0s left immediately after the completion of reprovisioning $F_k$ number of dedicated DS0s due to the failure of the DS1 numbered K(where $1 \leq K \leq N$), then $$F_k + r_k = R_{total} - R_k \quad (1),$$

which is equivalent to $$F_k + r_k + R_k = R_{total} \quad (2)$$

Let $r_{total}$ identify the total number of excess reserved DS0s, by extending the above analysis to all the N DS1s. Since the goal of the method is to reserve a minimum number of DS0s, $r_{total}$ is expected to be 0. This is equivalent to saying that each of the $r_k$ values is expected to be 0. This is because, $$r_{total} = \sum_{j=1}^{N} r_j = 0 \quad (3)$$

is only achieved when each of the $r_j$s is 0.
When $r_k = 0$, $$i \; F_k + r_k = R_{total} \quad (4)$$

In other words, the goal of reserving a minimum of DS0s is achieved when the following conditions are met:

$$F_1 + r_1 = R_{total} \quad (5) \text{ and,}$$

$$F_2 + r_2 = R_{total} \quad (6) \text{ and,}$$

continuing . . .

$$F_N + r_N = R_{total} \quad (7),$$

which is equivalent to saying:

$$F_1 + r_1 = F_2 + r_2 = \ldots F_k + r_k = F_N + r_N \quad (8)$$

In summarizing the above discussion, in order to reserve a minimum but sufficient number of DS0s the repro reserve method attempts to distribute the reserving of DS0s in such a way so that all of the DS1s end up having the same $F_k + r_k$ values.

Figure 10B:
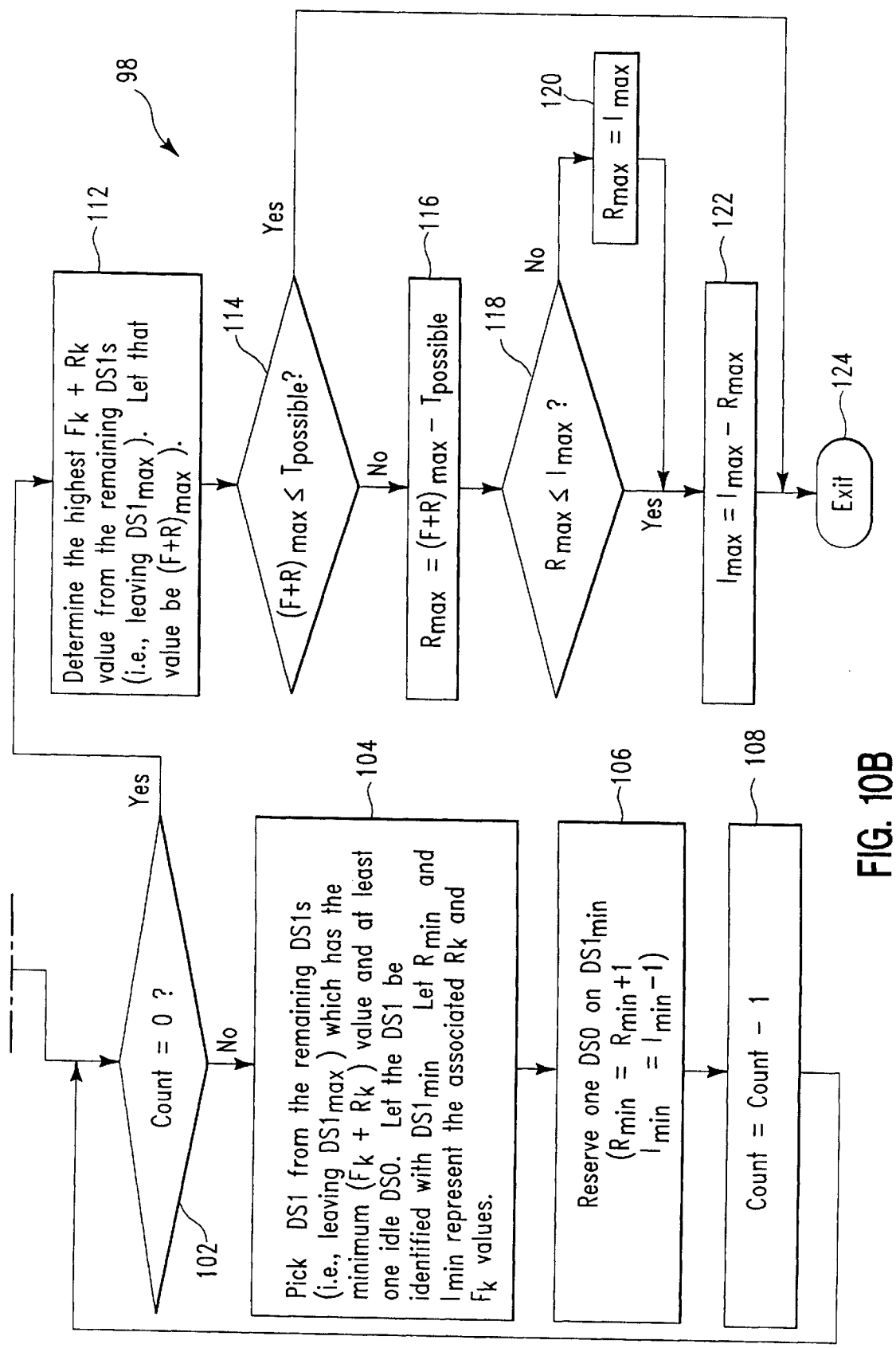
FIG. 10 is a flow diagram of a repro reserve method according to the present invention.

FIG. 10 shows a flow diagram of a repro reserve method according to the present invention. Due to its periodic invocation, the method 84 starts out assuming it is being invoked for the first time. Thus, the base counts of all of the DS1s associated with the IDLC system are initialized to have 0 reserved DS0s 86, which means For K=1 to N $$I_k = I_k + R_k \quad (9)$$

$$R_k = 0$$

Then the DS1 which has the highest number of dedicated DS0s is identified 88. In this step, this particular DS1 is labeled by $DS1_{max}$ and the number of dedicated DS0s this DS1 is associated with $F_{max}$. Finding the DS1 with the highest number of dedicated DS0s is important because this determines the minimum number of DS0s that are required to be reserved in case of a failure. Since the number of DS0s reserved must be able to cover the failure of any one of the DS1s included in the IDLC system.

The method 84 next determines the number of idle DS0s the remaining DS1s are carrying 90 excluding $DS1_{max}$. This step then associates the number of the idle DS0s with $I_{remaining}$. Determining $I_{remaining}$ is important because this enables the method to determine if additional DS0s need to be reserved beyond $I_{remaining}$. This is determined indirectly by comparing $I_{remaining}$ with $F_{max}$ 92 to see if $I_{remaining} \geq F_{max}$. If this is true, $T_{possible}$ is equated with $F_{max}$ 94. If this is not true, $T_{possible}$ is equated with $I_{remaining}$ 94. Thus, $T_{possible}$ is set to the smaller of either $F_{max}$ or $I_{remaining}$, which is utilized by the method 84 to reserve the proper number of DS0.

The method 84 then sets a variable count equal to $T_{possible}$ 100. The next portion of the method 98 operates in a continuous loop to reserve the number of DS0s in the remaining DS1s that corresponds to $T_{possible}$. This is accomplished by first checking to see if the Count=0 102, which enables the loop 98 to be broken. Initially the variable count is not equal to 0 and then a DS1 is chosen which has both the minimum $F_k+R_k$ value and at least one idle DS0 104. An additional DS0 is then reserved in the chosen DS1 106. The variable count is then decreased by one 108 and the method 84 loops back to where it again checks to see if the count=0 102. The method 84 stays in the loop 98 until the count=0, which means that all of the $T_{possible}$ number of DS0s have been reserved.

The above described loop 98 first reserves DS0s in DS1s having minimal $F_k+R_k$ values, in order to evenly distribute the reservation process so that $F_k+R_k$ values of all the DS1s are equal. This is desirable because according to equation 8 such a condition ensures that the minimum necessary number of DS0s are reserved.

After the count=0, the DS1 is selected which has the maximum $F_k+R_k$ value out of the remaining DS1s and designates this value by $(F+R)_{max}$ 112. Then $(F+R)_{max}$ is compared to $F_{max}$ to see if $(F+R)_{max} \leq T_{possible}$ 114. If this is true, a sufficient number of DS0s have already been reserved to cover a failure of one of the DS1s and the method then exits 124. If this is not true, additional DS0s are required to be reserved in $DS1_{max}$, which has the highest number of dedicated DS0s.

The additional DS0s are reserved by first calculating $(F+R)_{max}-T_{possible}$ 116, which is the number of additional DS0s that are required to be reserved. Then $R_{max}$ is compared to $I_{max}$ to see if $R_{max} \leq I_{max}$ 118, which determines if $DS1_{max}$ has a sufficient number of idle DS0s to be reserved. If this is true, then the required number of DS0s are reserved in $DS1_{max}$ by setting $I_{max}=I_{max}-R_{max}$ 122. If this is not true, the number of idle DS0s are increased by setting $R_{max}=I_{max}$ 120. Then the required number of DS0s are reserved in $DS1_{max}$ by setting $I_{max}=I_{max}-R_{max}$ 122. After performing this step the method exits 124.

In regard to the method steps designated by numerals 112–122 of FIG. 10, the $T_{possible}$ number of reserved DS0s are sufficient to cover the failure of any one of the remaining DS1s excluding $DS1_{max}$ only when $T_{possible}$ is greater than or equal to the $F_k+R_k$ values associated with those DS1s.

The DS0s reserved on a DS1 are not available when that particular DS1 fails. In other words, the number of DS0s available to cover the failure of a DS1 numbered L (where $2 \leq L \leq N$) is equal to $T_{possible}-R_L$. The number of DS0s required when the DS1 numbered L fails is equal to the number of dedicated DS0s on that DS1 which is $F_L$.

The $T_{possible}-R_L$ number of reserved DS0s (i.e. reserved on the DS1s excluding the DS1s numbered 1 and L) are sufficient enough to cover the failure of the DS1 numbered L when $T_{possible}-R_L$ is greater than or equal to $F_L$. In other words, no additional DS0s are required to cover the failure of the DS1 numbered L when the following is true:

$$T_{possible}-R_L \geq F_L \quad (10), or$$

$$T_{possible} \geq F_L 30 R_L \quad (11)$$

In the event $F_L > T_{possible}-R_L$, a few additional DS0s are required to cover the failure of the DS0 numbered L. This additional number of reserved DS0s required is equal to $F_L-(T_{possible}-R_L)$ or $F_L+R_L-T_{possible}$.

Let P and Q identify two DS0s which have $F_k+R_k$ values greater than $T_{possible}$. The additional number of reserved DS0s required to cover the DS1 P is equal to $F_p+R_p-T_{possible}$ and the additional number of reserved DS0s required to cover the DS1 Q is equal to $F_Q+R_Q-T_{possible}$. The additional reserved DS0s are made mutually available to one another when the reservation is made on a DS1 which is different from those two. Generalizing this to the DS1 numbered 2 to N, the desired DS1 where the additional number of DS0s have to be reserved is 1.

Accordingly, when $F_p+R_p-T_{possible}$ number of DS0s are reserved on the DS1 numbered 1, these additionally reserved DS0s are available to cover the failure of the DS1 numbered Q. Therefore, the total number of reserved DS0s available to cover the failure of the DS1 numbered Q is now increased to:

$$T_{possible}-R_Q+F_p+R_p-T_{possible} \quad (12), or$$

$$F_p+R_p-R_Q \quad (13).$$

Since $F_Q$ identifies the total number of reserved DS0s required to cover the failure of the DS1 numbered Q. additional DS0s are not required if:

$$F_Q \leq F_p+R_p-R_Q \quad (14),$$

which is equivalent to saying that additional DS0s are not required to be reserved if:

$$F_Q+R_Q \leq F_p-R_p \quad (15).$$

Therefore, by choosing the highest possible $F_k+R_k$ value and by reserving the required $(F+R)_{max}-T_{possible}$ number of DS0s on the DS1 numbered 1, all the remaining DS1s can be covered even if some other DS1s have $F_k+R_k$ values greater than $T_{possible}$.

In summary, the method steps designated by the numerals 112–122 of FIG. 10 determines the DS1 (from the DS1s 2 to N) which has the highest $F_k+R_k$ value. Let $(F+R)_{max}$ identify the corresponding $F_k+R_k$ value. As illustrated above, no additional DS0s are required to cover the failure of the associated DS1 as long as $T_{possible}$ is greater than or equal to $(F+R)_{max}$. When $(F+R)_{max}$ is greater than $T_{possible}$, the additional number of reserved DS0s which are required to cover the failure of the DS1 associated with the $(F+R)_{max}$ is equal to $(F+R)_{max}-T_{possible}$. The method reserves $(F+R)_{max}-T_{possible}$ number of DS0s on the DS1 numbered 1 (i.e., $R_1=(F+R)_{max}-T_{possible}$) provided enough idle DS0s are available on that DS1. In other words, if $(F+R)_{max}-T_{possible}$ is greater than $I_1$ then the method reserves an $I_1$ number of DS0s on the DS1 numbered 1 (i.e., $R_1=I_1$).

The following are examples of the operation of a repro reserve method according to the present invention.

EXAMPLE 1

$N=3$, $F_1=6$, $F_2=5$, $F_3=4$.

First, 6 (which is $F_1$) DS0s are reserved on DS1s 2 and 3. The reservation results in a $R_2=3$, $R_3=3$ or a $R_2=2$, $R_3=4$. In either case, the $(F+R)_{max}$ value is 8. Since 8 is larger than 6 (which is $F_1$), $R_1=(F+R)_{max}-F_1=8-6=2$.

When the DS1 numbered 1 fails, there are 6 reserved DS0s to cover the 6 DS0s on the DS1s numbered 2 and 3.

When the DS1 numbered 2 fails, there are 6 or 5 reserved to cover the 5 DS0s on the DS1s numbered 1 and 3. When the DS1 numbered 3 fails, there are 4 or 5 to cover the 4 DS0s on the DS1s numbered 1 and 2.

EXAMPLE 2

$N=3$, $F_1=7$, $F_2=3$, $F_3=2$.

First, 7(which is $F_1$) DS0s are reserved on DS1s 2 and 3. The reservation results in $R_2=3$, $R_3=4$. In this case, the $(F+R)_{max}$ value is 6. Since 6 is smaller than 7 which is $F_1$, no additional DS0s are required to be reserved on the DS1 numbered 1 or $R_1=0$.

When the DS1 numbered 1 fails, there are 7 reserved DS0s to cover the 7 DS0s on the DS1s numbered 2 and 3. When the DS1 numbered 2 fails, there are 4 reserved DS0s to cover the 3 DS0s on the DS1 numbered 3(note that $R_1=0$). When the DS1 numbered 3 fails, there are 3 reserved DS0s to cover the 2 DS0s on the DS1 numbered 2(note that $R_1=0$).

As noted above, the DS0 management element 76 also provides a method for calculating the maximum number of DS0s which have to be reserved. In a Digital Loop Carrier system with N number of DS1s and M number of non-concentrated lines, the minimum number of DS0s which have to be reserved to cover the failure of any (but at most one at any instant of time) of the DS1 is equal to M/(N−1) unless a single DS1 has more dedicated DS0s than this. In the illustrations given below, it is assumed that enough idle DS0s are available to perform the reservation.

Let $F_1, F_2, \ldots, F_N$ identify the number of dedicated DS0s on the DS1s numbered $1, 2, \ldots, N$ (i.e., $F_k$ represents the number of dedicated DS0s on the DS1 numbered K). Let $F_{total}$ identify the total number of dedicated DS0s within the IDLC system. It has to be noted that $F_{total}$ is equal to M. Let the DS1 numbers be identified in such a way that the corresponding $F_k$ values are in the descending order (i.e., $F_k \geq F_{k+1}$).

Let $R_1, R_2 \ldots, R_N$ identify the number of DS0s reserved on those DS1s numbered $1, 2, \ldots, N$ (i.e., $R_k$ represents the number of DS0s reserved on the DS1 numbered K). Let $R_{total}$ identify the total number of reserved DS0s within the IDLC system.

Let $r_1, r_2, \ldots, r_N$ identify the number of excessive DS0s left immediately after completing the reprovisioning process due to the failure of one of the DS1s numbered $1, 2, \ldots, N$(i.e., $r_K$ represents the number of excess DS0s left immediately after completing the reprovisioning process due to the failure of the DS1 numbered K). In other words, for K=1 to N, $$F_K + r_K = R_{total} - R_K \quad (16), \text{ or}$$

$$F_K + R_K = R_{total} - r_K \quad (17).$$

Utilizing equation 17 for all the DS1s, $$\sum_{j=1}^{N} F_j + \sum_{j=1}^{N} R_j = N * R_{total} - \sum_{j=1}^{N} r_j \quad (18)$$

$$F_{total} + R_{total} = N * R_{total} - \sum_{j=1}^{N} r_j, \quad (19)$$

or $$R_{total} = (F_{total}/(N-1)) + \left(\left(\sum_{j=1}^{N} r_j\right)\middle/(N-1)\right) \quad (20)$$

When $$\sum_{j=1}^{N} r_j = 0,$$

$$R_{total} = F_{total}/(N-1) \quad (21)$$

Based on the steps and rules of a repro reserve method, $$R_{total} = F_1 + R_1 \quad (22)$$

Utilizing equation 22 within the equation 17, $$r_1 = R_{total} - (F_1 + R_1) = 0 \quad (23)$$

Obviously, when $R_1=0$, $$R_{total} = F_1 \quad (24)$$

For $R_1 > 0$, $$R_1 = (F+R)_{max} - F_1 \quad (25)$$

Therefore utilizing equation 22, $$R_{total} = F_1 + R_1 = F_1 + (F+R)_{max} - F_1 = (F+R)_{max} \quad (26)$$

Then utilizing the equation 17, the $r_k$ value for the DS1 associated with $(F+R)_{max}$ is 0 (27)

Due to the rules and steps followed within a repro reserve method, the $F_k + R_k$ values of any two DS1s can differ by at most 1. Based on equations 23 and 27 (i.e., at least two of the $r_k$ values are 0), $$\sum_{j=1}^{N} r_j \leq (N-2) \quad (28)$$

Based on equations 18 and 28, $$R_{total} \leq (F_{total}/(N-1)) + ((N-2)/(N-1)) \quad (29), \text{ or}$$

$$R_{total} \leq (F_{total}/(N-1)) + 1 - (1/(N-1)) \quad (30)$$

Utilizing equations 19 and 30, $$(F_{total}/(N-1)) \leq R_{total} \leq (F_{total}/(N-1)) + 1 - (1/(N-11)) \quad (31)$$

Since $R_{total}$ represents the number of reserved DS0s, it has to be an integer value. Utilizing equation 31, $R_{total}$ has to be an integer which is greater than or equal to $(F_{total}/(N-1))$, but less than or equal to $(F_{total}/(N-1))+1-(1/(N-1))$. This is equivalent to saying:

$$R_{total} = \text{Smallest integer} \geq (F_{total}/(N-1)) \quad (32)$$

In summary, utilizing equations 23 and 32, the maximum number of DS0s which have to be reserved in an IDLC system with N number of DS1s and M number of non-concentrated lines so as to allow the reprovisioning process to complete its task successfully, is the larger of the following two values:

a) highest number of dedicated DS0s, a single DS1 has.
b) smallest integer $\geq$ M/(N−1).

Figure 11:
FIG. 11 is a flow diagram of a method for determining the maximum number of DS0s according to the present invention.

FIG. 11 shows a flow diagram of the method for determining the maximum number of DS0s required according to the present invention. The method 126 includes finding $F_{max}$ 126, which is the DS1 that has the greatest number of dedicated DS0s. Then an integer value is calculated which is $\geq M/(N-1)$ 128, where M corresponds to the number of non-concentrated lines and N corresponds to the number of DS1s the system includes. Finally, $F_{max}$ is compared to the integer value calculated in step 128 in order to find the maximum value 130, which corresponds to the maximum number of DS0s which have to be reserved in case of a failure DS1 within the system.

The following are examples of the operation of the method described in FIG. 11.

EXAMPLE 1

N=3, $F_1$=6$_2$, $F_2$=5, $F_3$=4.
M=6+5+4=15
Therefore, M/N(-1)=15/2=7.5

Since 6 (which is $F_1$) is smaller than 7.5, $R_{total}$ has to be the smallest integer greater than or equal to 7.5 In other words, the maximum numbers of DS0s which have to be reserved in this IDLC system is equal to 8.

EXAMPLE 2

N=3, $F_1$=7, $F_2$=3, $F_3$=2.
M=7+3+2=12
Therefore, M/N-1=12/2=6

Since 7 (which is $F_1$) is greater than 6, $R_{total}$=7. In other words, the maximum number of DS0s which have to be reserved in this IDLC system is equal to 7.

It should be specifically noted that the DS0s used during the reprovisioning process are not restricted to the DS0s reserved by a repro reserve method (as a matter of fact, the reprovisioning process needs an idle DS0). This flexibility enables the reprovisioning monitor to encounter the situation of not having enough reserved DS0s (this can happen if enough idle DS0s are not available when a repro reserved method is invoked) and complete its task of the reprovisioning process.

In the event the reprovisioning monitor is unable to find an idle DS0, the monitoring element defers the reprovisioning process until idle DS0s are available.

Additionally, it has to be noted that the reprovisioning monitor is able to support multiple DS1 failures due to the fact that a repro reserve method is invoked periodically and the monitoring element defers the reprovisioning process when idle DS0s are not available.

The following discussion relates to a model for demonstrating the overall detailed operation of the reprovisioning monitor within a Digital Loop Carrier system according to the present invention. The model uses an IDLC system which has 200 subscriber lines with 5 DS1s and which serves 10% of the subscriber lines in a non-concentrated mode. In other words, 20 subscriber lines have dedicated DS0s. Before a repro reserve method is invoked, the number of DS0s available to the 180 concentrated lines is equal to 96 (it is assumed that out of 120 DS0s, 20 are used as dedicated DS0s and 4 are used as the communication channels).

The model considers the failure of two DS1s (one after the another) and illustrates the management of DS1 based counts. Let the 5 DS1s be identified using the symbols $DS1_1$, $DS1_2$, $DS1_3$, $DS1_4$, and $DS1_5$. Let us assume that $DS1_1$ contains the two communication channels (Time Slot Management Channel (TMC) and Embedded Operations Channel (EOC). Further, let us assume that $DS1_5$ contains the backup of those two communication channels (referred to as TMC' and EOC'). Let $I_1$, $I_2$, $I_3$, $I_4$ and $I_5$ identify the 5 DS1 based counts indicating the number of idle DS0s. Let $F_1$, $F_2$, $F_3$, $F_4$ and $F_5$ identify the 5 DS1 based counts indicating the number of dedicated DS0s. Let $R_1$, $R_2$, $R_3$, $R_4$, and $R_5$ identify the 5 DS1 based counts indicating the number DS0s reserved by a repro reserve method. While provisioning those 20 non-concentrated lines, the DS0 management element 76 attempts to distribute the dedicated DS0s among the 5 DS1s, preferably equally. The repro reserve method of the present invention reserves the DS0s on the 5 DS1s to cover the failure of at most one DS1. FIGS. 12–24 include tables that illustrate the DS1 based counts values of the model.

FIG. 12 illustrates the counts before provisioning the 20 non-concentrated lines. FIG. 13 illustrates the counts after provisioning the 20 non-concentrated lines, but before reserving the DS0s (i.e., by the repro reserve method). FIG. 14 illustrates the counts after reserving the DS0s. The number of DS0s reserved by the repro reserve method is the smallest integer $\geq 20/4$ which is equal to 5.

Now assume that one of the DS1s fail and let the failed DS1 be $DS1_2$. The reprovisioning monitor reprovisions the 4 non-concentrated lines which have dedicated DS0s on the failed DS1. The repro reserve method, executed periodically, reserves the DS0s on the 4 DS1s to cover the failure of at most one DS1. In this regard, FIG. 15 illustrates the counts before reprovisioning the 4 non-concentrated lines. FIG. 16 illustrates the counts after reprovisioning the 4 non-concentrated lines, but before the repro reserve method is invoked again. FIG. 17 illustrates the counts after the repro reserve method is executed again. The number of DS0s reserved by the repro reserve method is the smallest integer $\geq 20/3$ which is equal to 7.

Now assume that another DS1 fails and let the failed DS1 be $DS1_3$. The reprovisioning monitor reprovisions the 5 non-concentrated lines which have dedicated DS0s on the failed DS1. The repro reserve method, executed periodically, reserves the DS0s on the 3 DS1s to cover the failure of at most one DS1. FIG. 18 illustrates the counts before reprovisioning the 4 non-concentrated lines. FIG. 19 illustrates the counts after reprovisioning the 4 non-concentrated lines, but before the repro reserve method is invoked again. FIG. 20 illustrates the counts after the repro reserve method is executed again. The number of DS0s reserved by the repro reserve method is the smallest integer $\geq 20/2$ which is equal to 10.

Now assume that the failed $DS1_2$ is repaired. The DS1 based count values for the reserved DS0s change due to the fact that the repro reserve method is executed periodically. FIG. 21 illustrates the counts before the repro reserve method is executed again. FIG. 22 illustrates the counts after the repro reserve method is executed again. The number of DS0s reserved by the repro reserve method is the smallest integer $\geq 20/3$ which is equal to 7.

Now assume that the failed $DS1_3$ is also repaired. The DS1 based count values for the reserved DS0s change due to the fact that the repro reserve method is executed periodically. FIG. 23 illustrates the counts before the repro reserve method is executed again. FIG. 24 illustrates the counts after the repro reserve method is executed again. The number of DS0s reserved by the repro reserve method is 7 since $DS1_4$ and $DS1_5$ have more dedicated DS0s than the smallest integer $\geq 20/4$ (i.e., 5).

In summary, the above model illustrates that the non-concentrated lines continue to have network access even when multiple DS1s fail. The repro reserve method, executed periodically, redistributes the reserved DS0s based on the current distribution of other counts. For simplicity, this model deliberately neglected the call processing aspects (i.e., in terms of altering the $I_k$ values) of concentrated lines. It has to be noted that in some cases the DS1 based counts may be distributed among the DS1s in more than one way. For example, the distribution of $R_k$ values in the last table can be reversed between $DS1_2$ and $DS1_3$ (i.e., the $R_k$ value for the $DS1_2$ can be 4 and the $R_k$ value for the $DS1_3$ can be 3).

The embodiments described herein are merely illustrative of the principles of the present invention. Various modifications may be made thereto by persons ordinarily skilled in the art, without departing from the scope or spirit of the invention.

What is claimed is:

1. A method for managing transmission lines within a communication system which enables the automatic restoration of network access for user lines, said communication system including user lines interfaced with groups of transmission lines and each of said group of transmission lines including dedicated transmission lines which are connected to said user lines, idle transmission lines and reserved transmission lines, comprising the steps of:

determining which one of said groups of transmission lines has the greatest number of dedicated transmission lines and counting the number of dedicated transmission lines in said group;

counting the total number of idle transmission lines within said other groups of transmission lines;

comparing the number of dedicated transmission lines in the group with the greatest number of said lines to said total number of idle transmission lines in order to determine a minimum number of idle transmission lines to be reserved; and reserving said minimum number of idle transmission lines within said other groups of transmission lines.

2. The method of claim 1, further comprising the step of reserving an additional number of idle transmission lines within the group of transmission lines having the greatest number of dedicated transmission lines if the number of dedicated transmission lines in said group is less than said total number of idle transmission lines, said additional number of idle transmission lines corresponding to the difference between the number of dedicated transmission lines in the group with the greatest number of said lines and said total number of idle transmission lines.

3. The method of claim 2, wherein the step of reserving an additional number of idle transmission lines comprises comparing said minimum number of idle transmission lines to the combination of dedicated transmission lines and reserved transmission lines in the one of said other groups of transmission lines having the greatest combination of said lines.

4. The method of claim 1, wherein the steps are executed periodically and further comprising the step of initially reducing said reserved transmission lines of said groups of transmission lines to zero.

5. The method of claim 1, wherein the step of reserving said minimum number of idle transmission lines comprises continually reserving a single transmission line within said other groups of transmission lines that have an idle transmission line and a certain minimum number of dedicated transmission lines and reserved transmission lines.

6. The method of claim 1, wherein said communication system is a Digital Loop Carrier system.

7. The method of claim 6, wherein said user lines are non-concentrated subscriber lines.

8. The method of claim 6, wherein said groups of transmission lines are Digital Signal Level 1 lines.

9. The method of claim 8, wherein each said Digital Signal Level 1 line includes a plurality of Digital Signal Level 0 lines.

10. The method of claim 6, wherein said user lines are interfaced with groups of transmission lines by a remote terminal.

11. The method of claim 1, wherein said communication system is a distributed Digital Loop Carrier system.

12. The method of claim 11, wherein said user lines are Integrated Service Digital Network lines.

13. The method of claim 11, wherein said groups of transmission lines are groups of Digital Signal Level 1 lines.

14. The method of claim 13, wherein each said Digital Signal Level 1 line includes a plurality of Digital Signal Level 0 lines.

15. The method of claim 12, wherein said user lines are interfaced with groups of transmission lines by an interface device that separates the respective B and D channels of an Integrated Service Digital Network line.

16. A method for determining the maximum number of transmission lines to be reserved in a communication system in order to enable automatic reprovisioning of user lines in the event of a failure of the transmission lines, said communication system including user lines interfaced with groups of transmission lines, each of said group of transmission lines including dedicated transmission lines which are connected to said user lines, comprising the steps of:

determining which one of said groups of transmission lines has the greatest number of dedicated transmission lines and counting the number of dedicated transmission lines in said group;

calculating an integer value which is at least equal to the total number of said user lines divided by one less than the total number of said groups of transmission lines; and comparing said integer value to said number of dedicated transmission lines in order to determine a maximum number of idle transmission lines to be reserved.

17. The method of claim 16, wherein said communication system is a Digital Loop Carrier system.

18. The method of claim 17, wherein said user lines are non-concentrated subscriber lines and said groups of transmission lines are Digital Signal Level 1 lines including a plurality of Digital Signal Level 0 lines.

19. The method of claim 16, wherein said communication system is a distributed Digital Loop Carrier system.

20. The method of claim 19, wherein said user lines are Integrated Service Digital Network lines and said groups of transmission lines are groups of Digital Signal Level 1 lines including a plurality of Digital Signal Level 0 lines.

* * * * *